(12) United States Patent
Lindsay

(10) Patent No.: US 6,887,162 B2
(45) Date of Patent: May 3, 2005

(54) APPARATUS FOR MEASURING PARAMETERS RELATING TO THE TRAJECTORY AND/OR MOTION OF A MOVING ARTICLE

(76) Inventor: Norman Matheson Lindsay, 19 Batchelors Way, Amersham, Bucks, HP7 9AH (GB)

(*) Notice: Subject to any disclaimer, the term of this patent is extended or adjusted under 35 U.S.C. 154(b) by 116 days.

(21) Appl. No.: 10/090,363

(22) Filed: Mar. 4, 2002

(65) Prior Publication Data

US 2002/0103035 A1 Aug. 1, 2002

Related U.S. Application Data

(60) Division of application No. 09/291,273, filed on Apr. 14, 1999, which is a continuation-in-part of application No. PCT/GB97/02873, filed on Oct. 17, 1997.

(30) Foreign Application Priority Data

Oct. 19, 1996 (GB) .............................................. 9621828
Mar. 18, 1997 (GB) .............................................. 9705589

(51) Int. Cl.[7] .............................................. A63B 57/00
(52) U.S. Cl. .................................................... 473/151
(58) Field of Search .............................. 473/219–255, 473/150–156

(56) References Cited

U.S. PATENT DOCUMENTS

| 3,601,408 A | 8/1971 | Wright |
| 3,759,528 A | 9/1973 | Christophers et al. |
| 4,136,387 A | 1/1979 | Sullivan et al. |
| 4,137,566 A | 1/1979 | Haas et al. |
| 4,150,825 A | 4/1979 | Wilson |
| 4,254,956 A | 3/1981 | Rusnak |
| 5,257,084 A | 10/1993 | Marsh |
| 5,342,054 A | * 8/1994 | Chang et al. ............... 473/156 |
| 5,390,927 A | 2/1995 | Angelos |
| 5,401,030 A | 3/1995 | Halliburton |
| 5,437,457 A | 8/1995 | Curchod |
| 5,472,205 A | 12/1995 | Bouton |
| 5,626,526 A | 5/1997 | Pao et al. |
| 5,692,966 A | 12/1997 | Wash |
| 5,718,639 A | * 2/1998 | Bouton ....................... 473/151 |
| 5,803,823 A | 9/1998 | Gobush et al. |
| 6,041,651 A | * 3/2000 | Naruo et al. .................. 73/491 |
| 6,095,928 A | * 8/2000 | Goszyk ...................... 473/222 |
| 6,196,932 B1 | * 3/2001 | Marsh et al. ............... 473/223 |

FOREIGN PATENT DOCUMENTS

| GB | 2 115 704 | 9/1983 |
| JP | 55146046 | 11/1980 |
| JP | 6114134 | 4/1994 |
| WO | 95/35141 | 12/1995 |

OTHER PUBLICATIONS

"Tempo Trainer 911"; Pamphlet Describing Product, Published 1995, Applied Golf Technology, Burbank, California 91510.

* cited by examiner

Primary Examiner—John M. Hotaling, II
(74) Attorney, Agent, or Firm—Davis & Bujold, P.L.L.C.

(57) ABSTRACT

The apparatus comprises one or more light sources (18,15) for providing light emitted from or reflected by the moving article and one or more light sensing mechanisms (15, 12, 50, 51) arranged to provide a signal when illuminated by said light, at least one of the light sensing mechanisms (15, 12, 50, 51) being arranged to detect when the moving article intercepts a known detection plane (19, 20, 21, 64, 65, 66, 67), wherever the article intercepts the plane. The sensing mechanism may comprise a slit aperture (10, 11, 12, 23, 60, 61) and/or cylindrical lens to define a detection plane. The apparatus may be used to measure the pre-impact and post-impact position and/or motion of a golf clubhead (7) and/or of a golf ball (1) during execution of a golf shot.

50 Claims, 8 Drawing Sheets

APPARATUS FOR MEASURING PARAMETERS RELATING TO THE TRAJECTORY AND/OR MOTION OF A MOVING ARTICLE

This application is a divisional of U.S. Ser. No. 09/291,273 filed Apr. 14, 1999 which is a continuation-in-part of PCT/GB97/02873 filed Oct. 17, 1997.

TECHNICAL FIELD

This invention relates to apparatus for measuring parameters relating to the trajectory and/or motion of a moving article and, in particular, apparatus for measuring and recording the pre-impact and post-impact position and/or motion of a golf clubhead and golf ball during the execution of a golf shot.

BACKGROUND ART

Most contemporary commercial golf swing analysers use arrays of light beams and coacting electro-optical sensors. In a typical conventional golf swing analyser, a plurality of discrete light sensors are arranged in line at regular, known intervals, with two or more such arrays built into a playing mat and extending transversely to the intended direction of clubhead travel prior to ball impact. The light sensors are normally illuminated from a single source at ceiling height so that the effective light beams received by each sensor in an array are approximately parallel and vertical. The light sensors detect the shadow of a clubhead as it travels at speed towards a golf ball. By recording and processing the sequence of light interrupts in the light sensors, various parameters such as clubhead speed, swingpath angle, impact offset and clubface angle at impact can be computed.

The clubhead sensing method as outlined above has been established practice for many years. U.S. Pat. No. 3,601,408 issued in 1971 is one early prior art document which still forms the basis of many of today's golf swing analysers. Other prior art in golf swing analysers teaches the use of electro-optical sensors that operate from incident light reflected off part of a clubhead (as distinct from a clubhead interrupting or shadowing directly incident light). This later mode of operation is exemplified in GB 2115704 and U.S. Pat. No. 5,257,084.

In comparison to known methods, the present invention aims to provide more extensive and more precise data using only a relatively small number of sensor signals.

According to a first aspect of the invention, there is provided apparatus for measuring parameters relating to the trajectory and/or motion of a moving article, the apparatus comprising one or more light sources for providing light emitted from or reflected by the moving article in a known shape or pattern and one or more light sensing means, each light sensing means being arranged to provide a signal when it is illuminated by said light, wherein the field of view of each light sensing means or the illumination field of each light source defines a detection plane across the path of the moving article and at least one of the light sensing means is arranged to detect when the moving article intercepts a given detection plane wherever the article intercepts the detection plane and is arranged to sense variations in the said signal as the article passes through the detection plane and light from or reflected by different parts of the said shape or pattern is detected, the arrangement being such that the position and orientation of the detection plane relative to a reference point is known or can be deduced from the signal provided by the said at least one sensing means and the position and/or orientation of the article relative to the detection plane can be determined from said signal According to another aspect of the invention, the apparatus is provided in combination with one or more articles the movement of which is to be sensed, the or each of the articles being provided with a reflective portion and/or light emitting means.

The article may comprise a golf club and, according to a further aspect of the invention, there is provided a golf club for use with the apparatus, the golf club being provided with at least one diffusely reflective region surrounded by a relatively non-reflective region and/or with at least one light emitting means together with a power source therefor.

During the pre-impact measurement phase, the position of a golf ball is fixed (motionless) relative to the apparatus and normally only measurements of the golf clubhead are performed. During the post-impact measurement phase, only measurements of the golf ball motion are normally required, but measurements of the post-impact motion of the clubhead can also be obtained to yield additional information on the impact event.

Apparatus according to the invention may be used to provide fast quantitative measurements of various parameters of a golf shot, and is of benefit to golfers in providing feedback relating to important aspects of their shot making skills. The apparatus is also useful for purposes of custom club fitting, where measurable parameters of a golfer's swing are used in a decision process to select the properties of various components that comprise a golf club. The invention may also be used in golf simulation equipment, where it is required to compute the hypothetical free flight of a golf ball off a golf shot in confined, flight restricting environments.

The purpose of performing measurements on both the clubhead and the golf ball is to obtain data that could not easily be obtained by measuring only the clubhead or only the golf ball.

For example, in golf simulation applications, it is required to predict the flight of a golf ball from data of its initial launch conditions. Whereas some of this data is most easily and reliably obtained from direct measurements of the golf ball after impact, other data is best obtained indirectly from measurements of the clubhead prior to impact, and from knowledge of the relevant mass and inertial properties of the clubhead and ball. Data that are preferably measured directly are the linear velocity components of the ball. Data that are preferably found indirectly from measurements of both the clubhead and the ball are the spin components of the ball.

The spin components imparted to the ball at impact strongly influence the ultimate distance and direction of flight, but the spin of the ball is very difficult to detect by direct measurement of the ball just after impact. Spin is imparted to the ball when the striking surface of the clubhead is oblique to the direction of the line of impact and/or when the centre of mass of the clubhead is off-set from the line of impact. For example, if the swingpath angle (i.e. the azimuth angle of the clubhead motion) and the ball launch angle (in azimuth) are equal, and the impact point is on the "sweet spot" of the clubhead (nearest to the centre of mass of the clubhead), then the sidespin component of the ball in flight is zero. By measuring the clubhead swingpath at impact, the offset of the clubhead relative to the ball at impact and the azimuth launch direction of the ball, an accurate estimate of the magnitude and sense of sidespin imparted to a ball may be made.

In club fitting applications, it is desirable to have comprehensive data relating to a customer's golf swing. This includes all the components of motion of the clubhead at impact (speed, swingpath angle, attack angle and clubhead rotation), and all the components of the clubhead orientation and position at impact (clubface angle, dynamic lie, dynamic loft, height and impact offset). In a typical embodiment of a measurement system according to the invention, most of the above parameters can be readily found by direct measurements on the clubhead, but others are preferably found by also measuring the direction of the ball as it leaves the clubhead. For example, the dynamic loft of a clubhead at impact can be determined from measurements of the clubhead attack angle (that is, the elevation angle of the clubhead motion at impact), the elevation launch angle of the golf ball and knowledge of the golf ball and clubhead impact characteristics.

When the ball is struck, it initially remains in contact with the clubface and travels a distance of a few millimeters before parting from the club. Thereafter, the ball travels through the air in a direction that is primarily determined by the pointing direction of the clubface at initial impact and by the direction of motion of the clubhead at initial impact. As it travels through the air, the ball is subject to gravity and to various aerodynamic forces, but in the first few meters of flight the combination of all these forces has very little effect on the direction of travel, so the initial flight path can be considered to be straight to within a very small fraction of a degree for all normal full swing golf shots.

In contrast to the ball motion, the motion of the clubhead is not rectilinear. Prior to impact, the clubhead moves in a curvilinear arc and is subject to significant rotation about the shaft axis. The curvature and plane of the clubhead arc differ from player to player, as does the rate of clubhead rotation. This curvature of the clubhead motion leads to significant measurement errors in known apparatus where typically swingpath angles are measured at only two points along a substantial portion of a clubhead path prior to impact.

In order to equate pre-impact and post-impact events during a golf shot, apparatus according to the invention is preferably capable of predicting the motion of the clubhead very near the point of impact, and be capable of resolving small angular differences (e.g. 0.5 or better) between the immediate pre-impact motion of a clubhead and the ensuing flight of a ball struck by said clubhead. Many known apparatus in common use provide only relatively coarse resolution (typically 2.0 for swingpath angle) and are capable of only two dimensional measurements of horizontal components of motion and orientation. Thus important parameters such as attack angle, dynamic loft and dynamic lie are absent.

Preferred embodiments of the present invention provide equipment which measures clubhead and ball behaviour in the impact region using arrays of electro-optical sensors in conjunction with light aperturing and/or light focusing devices in configurations that provide high quality measurements of all parameters relating to the dynamics of a clubhead-on-ball impact and more extensive and more precise data is provided using only a relatively small number of sensors. Advantageously, apparatus according to the invention may be used with any standard make of golf club or golf ball and the playing surface or tee-off arrangement can be of unrestricted form as these do not need to form part of the measurement equipment.

In a preferred embodiment of the present invention, one or more parts of a clubhead are selectively illuminated as the clubhead travels through a region just prior to impact with a golf ball. Additionally, one side of the said golf ball is selectively illuminated during part of its initial flight trajectory after impact. For convenience, the above selectively illuminated parts of a clubhead or ball are hereinafter referred to as highlights. Light emitted from each highlight is detected by a plurality of electro-optical sensor devices arranged in sensor arrays, with at least one array configured to detect clubhead highlights and a separate array configured to detect the ball. Associated with each sensor device in an array there is provided at least one aperture and/or lens that limits or focuses the field of view of the light sensor device. The combination of a sensor device with an aperture and/or focusing lens is arranged to provide a wide angle of view in one plane with a narrow angle of view in the orthogonal plane. For convenience we refer herein to the field of view as a 'detection plane'.

The wide angle of view of the detection plane preferably extends over at least 5 degrees and, in some cases, may extend over at least 120 degrees. The narrow angle of view in the orthogonal direction, which determines the thickness of the detection plane preferably extends over 1 degree or less or more preferably over 0.25 degree or less. In a typical case, with a divergence of 0.25 degrees and a highlight at a distance of 36 cm from the light sensor, the thickness of the detection plane at the point the highlight passes through it will thus be less than 2 mm.

The detection planes are preferably arranged to traverse the path of a clubhead or ball at various positions along the path and at various angles thereto. As a highlight travels into the field of view of a sensor, data capture circuits record the time and amplitude response of the sensor to the received incident light. These data are used to compute the speed, position and direction of the highlights and thus the clubhead and ball motion.

At least one of either a sensing device or a coacting combination of aperture and/or lens is preferably elongate. In one form of the invention, the said sensor devices comprise discrete sensors (i.e. having one signal responsive to light incident on one small photo-sensitive area) and the said apertures and/or lenses comprise slit apertures and/or cylindrical lenses. In another form of the invention, the sensor devices are elongate and may comprise a linear pixel array (e.g. a CCD array) or an electro-optical one dimensional position sensitive detector (PSD), whereas the apertures are 'pin-hole' types (i.e. small, circular apertures or the like) and the lenses are spherical, focusing to a point. In the case of the linear pixel array, the field of view is composed of a set of overlapping, narrow conical beams spread across the detection plane and the linear pixel array is used as a form of position sensitive detector.

Both the sensing device and the coacting combination of aperture and/or lens may also be elongate. When two such elements are combined (e.g. a slit aperture coacting with a linear CCD array), a set of detection planes are provided corresponding to each of the pixels in the CCD array. When the slit aperture and the CCD array are parallel, the above set of detection planes are co-planar and overlapping, but offset slightly from each other. When the slit aperture and coacting CCD array are not parallel, then the set of detection planes do not overlap.

Typically, the highlights are provided by direct light emission from specially mounted light emitting devices on a clubhead (primary highlights) or by reflection from diffusely reflecting zones (secondary highlights) provided on the clubhead or ball using fixed position primary light emitting arrays to illuminate the reflective zones. For practical reasons, the highlight from a golf ball is preferably of the latter (secondary) type, and the reflecting zone comprises the hemispherical surface on an illuminated side of said ball.

The light emission from a highlight may be continuous or pulsed. In one preferred embodiment, low duty cycle pulsed emissions with a repetition frequency in the range 10 kHz to 100 kHz are used with measurements coinciding with each pulse. This corresponds to providing measurements of a clubhead and ball positions at intervals of a few millimeters to a fraction of a millimeter. (In a 'full swing' golf shot the clubhead speed at impact is typically in the range 25 m/s to 55 m/s, and ball launch speeds are typically 30% to 60% greater).

In one embodiment of the invention, one or more highlights for a clubhead are provided as one or more light emitting devices (LED's) which are mounted at known positions on the clubhead (typically near the heel and near the toe). Preferably, where two LED's are used, the, LED's are mounted on a small circuit substrate that is detachable from the clubhead and this substrate contains a suitable compact battery power source and means for controlling light emission and power drain. A suitable controlling means comprises a light detector and timing circuitry that are also mounted on the circuit substrate. The detector converts incident light from an external controlling light source into a signal that enables an on-board timer and this, in turn, powers the LED's for a predetermined period and also allows time multiplexing of highlights when two or more are provided on a clubhead. In this manner, the average power consumed by the LED's can be significantly limited by being switched on for only a few milliseconds during each swing. Preferably, the LED's and light detector operate in the near infra red (IR) spectrum but visible light or other light wavelengths may be used. Using IR wavelengths allows the clubhead mounted assembly to be covered with an overall IR transparent filter that appears to the human eye as an opaque black material. Thus, the circuit substrate and all on-board components can be hidden so the assembly can be designed to blend in with the clubhead appearance.

Where only one LED highlight is used, this is preferably mounted near the toe or embedded into the toe and arranged such that the radiation pattern from the LED has its major axis (i.e. peak response direction) accurately aligned parallel to both the clubface and the sole of the club. The LED radiation pattern should preferably be narrow (i.e. half-width 20 degrees or less). This allows accurate tracking of the change of position and direction of the LED radiation axis as the clubhead moves and rotates across the sensor array. From this, the speed, swingpath and orientation of the clubhead can be determined.

In a further embodiment, highlights for a clubhead are provided as diffusely reflective zones on one or more known positions on the clubface surface. Preferably, the highlights reflect light uniformly across the area of the reflective zone. The reflective zones may be circular, but advantageously the zones are specially shaped to enhance the time varying amplitude response of the received sensor signals and to provide features that indicate the orientation and/or position of the highlight relative to a detection plane. One preferred shape is a triangle mounted on the toe of the clubhead, with the plane of the triangle normal to the clubface and to the sole of the clubhead. Additionally, one side of the triangle is preferably aligned parallel to the loft of the clubface or rotated by a known angle thereto. The sizes of the sides and angles of the triangle are such that each corner passes separately right through a detection plane. With this arrangement, the points in time corresponding to each of the three corners of the triangle passing through the detection plane can be accurately determined and so the speed and orientation of the clubhead can be determined.

One or more primary light sources are preferably provided adjacent to the clubhead-on-ball impact zone and positioned to efficiently illuminate the diffusely reflective zones as the clubhead approaches the ball resting position, but also positioned a safe distance, e.g. at least 20 cm, away from possible contact by a clubhead during a normal golf shot. An associated sensor array is configured to accept light from such a highlight and means are preferably provided to substantially exclude from the collective field of view of the sensor array, reflected light from other parts of the clubhead and also from background reflections. Typically, the clubhead surface closely adjacent to a highlight is provided with a non-reflective coating. Other parts of the clubhead surface can advantageously comprise polished or mirror-like reflecting surfaces, providing that such surfaces reflect the primary light source in directions other than into the collective field of view of the sensor array, taking account of the directional characteristics of the primary light source. These features ensure that the highlights are well defined and contrast strongly against background light sources during the measurement phase.

The invention will now be further described, merely by way of example, with reference to the accompanying drawings in which.

Figure 1:
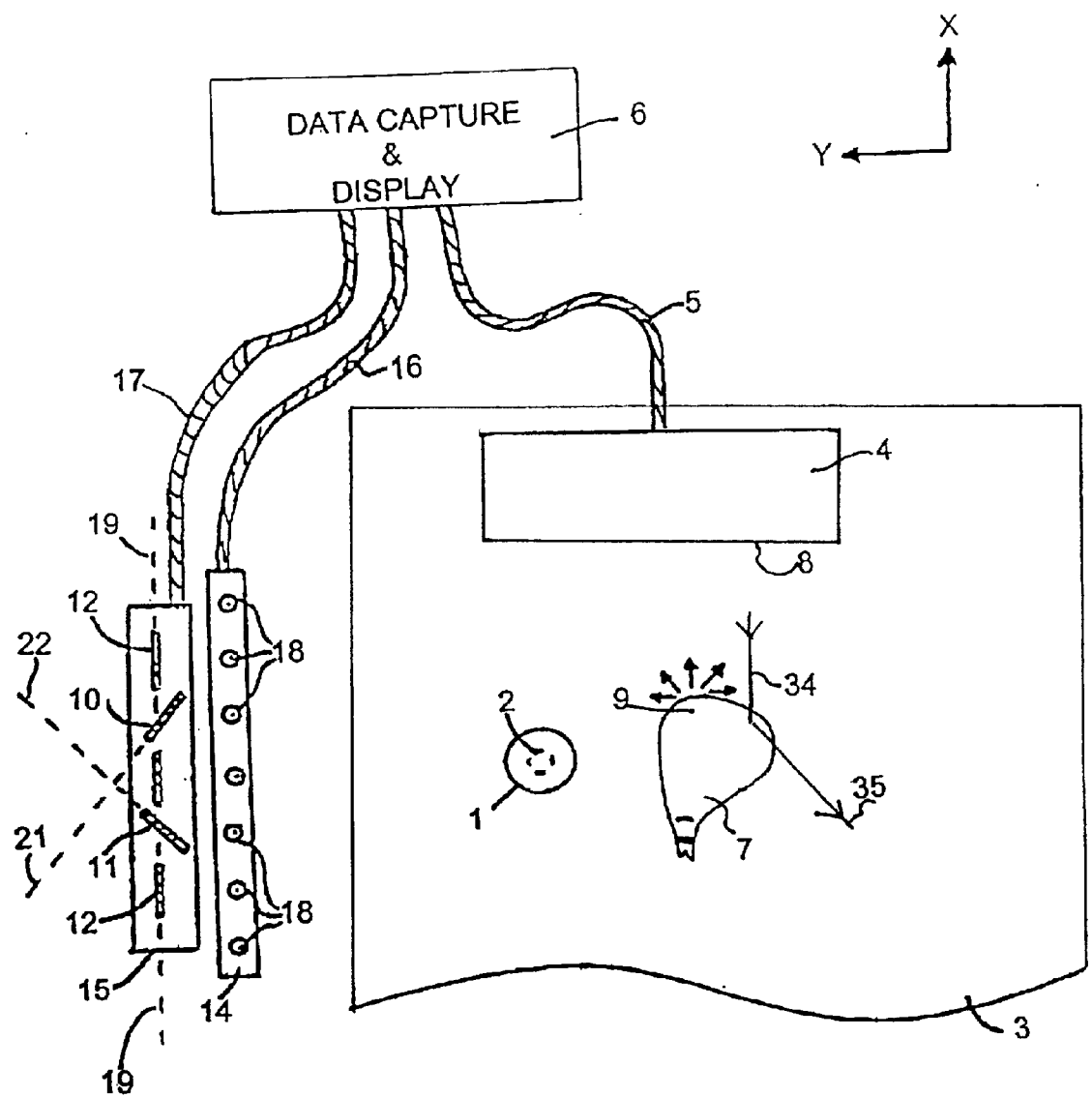
FIG. 1 is a schematic diagram in plan view of a clubhead, a golf ball and apparatus according to one embodiment of the invention at an instant of a swing just prior to impact.

For convenience, reference axes X, Y and Z are shown in the drawings. The Z axis is vertical and points upwards. The Y axis is horizontal and points along the general azimuth direction of ball travel. The X axis is orthogonal to Y and Z and points in the general 'heel-to-toe' direction of a clubhead at ball address.

Referring to FIG. 1, a golf ball 1 rests on a rubber tee 2 (shown by dotted circle). The tee 2 is semi-permanently fixed to a playing surface or play-off mat 3. Other ball placement arrangements may be adopted, for example the ball can be placed directly on a mat or on turf, provided that the placement spot is nominally on a known vertical axis in relation to the apparatus. An IR transmitting and receiving (TX/RX) assembly 4 is provided in a known position and orientation relative to the resting position of the golf ball 1. A signal and power cable 5 connects the TX/RX assembly 4 to signal control, data capture and display unit 6 which can be implemented either as a dedicated control and display module, or (via suitable interfacing) as a general purpose stand-alone computer such as a 'PC' system.

IR emitters 25 (see FIG. 3) on the TX/RX assembly emit a beam or beams of IR light towards the toe end of a clubhead 7. The IR emission is preferably pulse modulated with a repetition frequency of the order of 50 kHz or higher so that ac coupled signal amplification can be applied thus rejecting low frequency background light interference. Some of the pulse modulated light is reflected back towards the TX/RX assembly where it passes through a series of slit apertures 23, 60, 61 (see FIG. 3) provided on the front face 8 of the TX/RX assembly. In particular, light reflects off a specially designed diffusely reflecting zone provided on the toe end 9 of the clubhead. Light from this diffusely reflecting zone is intended to be the dominant component of back reflected light from the clubhead. This dominant reflecting zone is referred to herein as a highlight.

As the highlight passes across the field of view of a sensor inside the TX/RX assembly, a signal proportional to the instantaneous quantity of light incident on the sensor is generated and stored as data. Analysis of the data allows accurate estimation of the instant in time when the centre of the highlight was positioned along the major plane of the field of view of a given sensor. For convenience, such a plane is referred to hereinafter as a detection plane. Knowing the relative positions and angles of all the detection planes, parameters such as the clubhead speed and swingpath angle can be found from analysis of the highlight time and position data.

Figure 3:
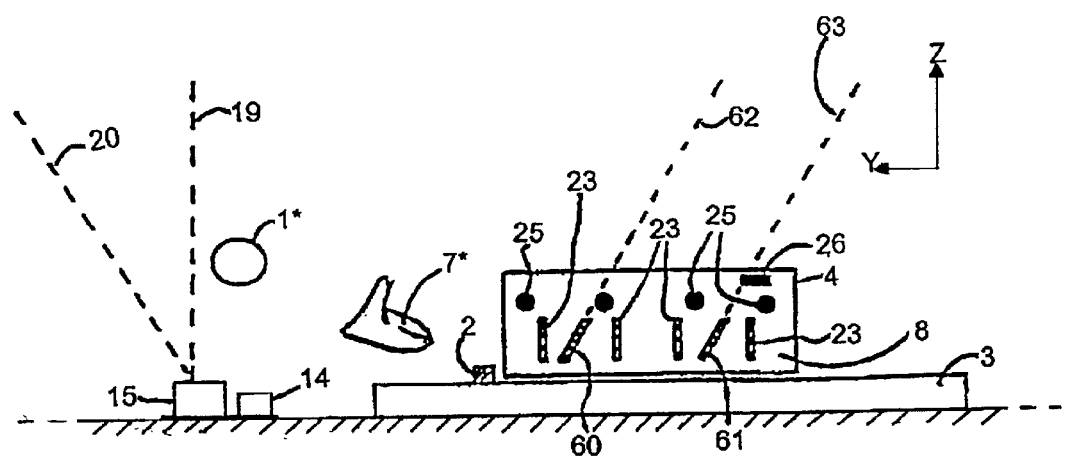
FIG. 3 shows a side view of the arrangement in FIG. 1, at an instant of a swing following impact.

Referring now to FIGS. 1 and 3, a second IR TX/RX assembly is provided comprising a TX array 14 and RX array 15 with corresponding signal and power cables 16, 17 for connection to the data capture and display unit 6. The TX and RX arrays are shown for clarity as separate units, but in practice these would advantageously be combined into a single assembly. The TX array comprises a number of small area IR emitters 18 mounted at approximately equal spacing along a line parallel to the X axis. The direction of peak emission for all the IR emitters 18 is typically vertically upward and the individual beams merge so that at some distance away from the emitters, the beams merge so as to effectively provide a single wedge-shaped beam extending some way on either side of the general ball flight path and with the wedge angle large enough to include the volume occupied by detection planes 19, 20 (see FIG. 3) at ball trajectory height. Alternatively, the beams axes may be tilted in the Y-Z plane away from the ball rest position 1. This alternative arrangement improves the spatial separation of a launched golf ball 1* (see FIG. 3) from the 'follow through' clubhead 7* (see FIG. 3) in the measurement zone. A wedge shaped beam is still formed but the central axial plane of the wedge is tilted off vertical and away from the ball rest position.

The RX array 15 comprises a top part which contains a plurality of narrow, elongate apertures 10, 11, 12 and coacting with these apertures, a plurality of sensor devices with associated circuitry, arranged below the apertures and inside the RX array 15 so as to form a series of detection planes for measuring the direction and velocity of a launched golf ball 1*. The sensor devices are photo-electric sensors, such as light-detecting diodes.

Three apertures 12 are co-linear and these are each used in conjunction with a respective pair of sensor devices to form two detection planes that are transverse to the Y direction (i.e. transverse to the general direction of ball flight). The two detection planes each comprise three smaller planes associated with the three co-linear apertures 12, and these smaller planes are nominally co-planar and merge to form the overall detection plane. The purpose of using three smaller planes is to increase the detection zone to ensure that all ball trajectories pass through part of the overall detection plane. This is particularly required for low trajectory shots where a single central aperture would not cover off-line shots. The two main detection planes are shown (illustratively) by dotted lines 19, 20 in FIG. 3. The detection plane denoted by dotted line 19 is vertical, whereas that denoted by dotted line 20 is at an angle to the vertical. In alternative arrangements, both planes can be at equal or different angles to the vertical and tilted in opposite directions in the Y-Z plane.

Figure 5:
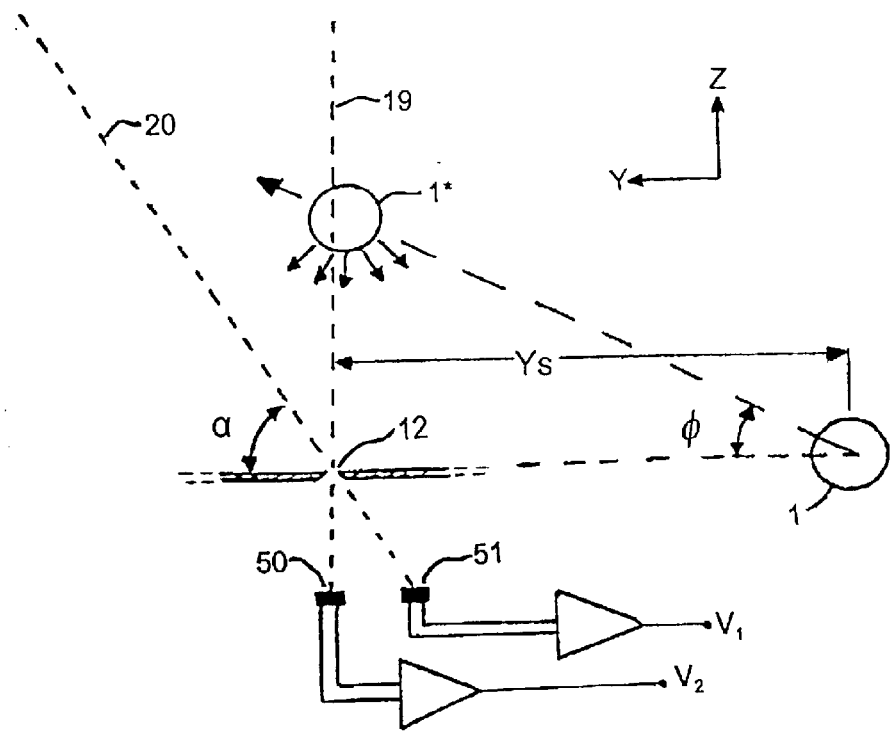
FIG. 5 is a schematic diagram of an arrangement of detection planes for measuring the initial launch trajectory of a golf ball.

A schematic view of an arrangement for analysing ball flight using such detection planes is shown in FIG. 5. Two detection planes denoted by dotted lines 19 and 20 are normal to the page of the diagram. As a launched golf ball 1* passes through the planar light beam generated by the TX assembly 14, it reflects light back throughout a wide angle. Some of this reflected light is incident on the RX array and passes through an aperture 12 to form a narrow slit of light. Light sensors 50, 51 are positioned below the aperture 12 and the fields of view that pass through the aperture from the two sensors form the detection planes centred along the dotted lines 19, 20 respectively. After launch, the golf ball 1* flies above and over the RX array 15 and first passes through the detection plane denoted by dotted line 19 and then through the detection plane denoted by dotted line 20.

Figure 6:
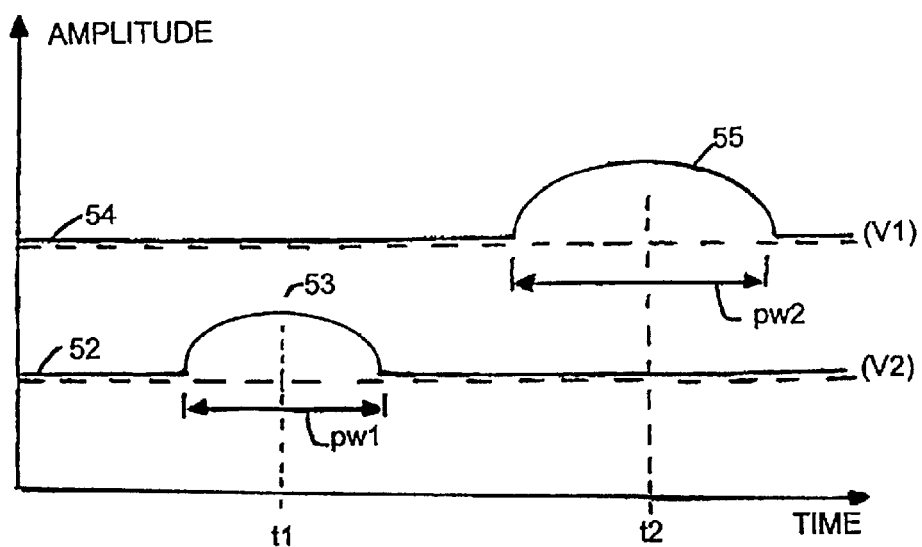
FIG. 6 shows time dependent waveforms of typical signals that are generated by the arrangement of FIG. 5.

Time variant signals corresponding to the passage of the ball through the respective detection planes are depicted in FIG. 6. Waveform 52 exhibits a peak 53 corresponding to the instant in time when the ball 1* is positioned centrally in the detection plane denoted by dotted line 19. Similarly, waveform 54 exhibits a peak at 55 when the ball is central in the detection plane denoted by dotted line 20. The waveform maxima are nearly flat and thus their exact time of occurrence are difficult to determine accurately by direct timing. Preferably, the timing of the peaks is measured by capturing data from the rising and falling edges of the pulse waveform (on either side of a peak) and assuming that the pulse shape is symmetrical about its peak. In theory, the maxima can be found to the necessary accuracy using only sparse data such as the timings of transitions above and below a fixed threshold on the rising and falling edges. To allow for a wide variation in received signal level (signal dynamic range), it is useful to apply logarithmic compression of the pulse amplitude followed by level sampling using analog-to-digital converters or amplitude-to-pulse-width converters or other suitable techniques.

In FIG. 6, the pulse width durations pw1 and pw2 correspond to the passage of the ball 1* through detection planes 19 and 20 respectively. Note that pw2 is greater than pw1 because the ball takes longer to pass through detection plane 20 as this plane is more oblique (than detection plane 19) to the ball trajectory. The pulse widths are proportional to the diameter of the ball 1\* and inversely proportional to the ball speed and to the sine of the angle subtended between the ball flight path and the detection plane. The time separation (t2−t1) between the pulse waveform peaks is also inversely proportional to ball speed and increases with the launch angle of the ball. Thus the ball speed and launch angle can be calculated by solving three simultaneous equations equating ball speed, ball diameter and launch angle with the measured values of pw1, pw2 and (t2−t1). However, a simpler calculation is obtained if the time of initial launch of the ball is known. The initial launch time 't0' is (to within a very small and determinable error) equal to the time of impact and this can be accurately found from measurements of the clubhead position and velocity. Alternatively, a direct measurement of the impact time using a microphone to detect the impact sound transient can be made. Knowing t1, t2 and t0, and assuming that the centre of the ball initially rests at the same horizontal level as the aperture 12, the elevation and speed of the ball can be found as follows:

$$\tan(\phi) = \tan(\alpha).(K/(1+K))$$

$$\text{ball speed} = Ys/(\cos(\phi).(t1-t0))$$

where:

$\phi$ is the ball launch elevation angle.

$\alpha$ is the angle of detection plane 20 relative to the horizontal.

$K$ is equal to $(t2-t1)/(t1-t0)$.

$Ys$ is the distance between the ball resting spot and the vertical detection plane 19.

Referring again to FIG. 1, it can be seen that the slit apertures 10 and 11 are arranged at oblique angles relative to the series of three collinear apertures 12. Coacting with each of the apertures 10, 11, there are provided one or more light sensors positioned vertically below the corresponding aperture so as to form one vertical detection plane for each aperture 10, 11. Thus, two nominally vertical detection planes are provided at oblique angles relative to the vertical X-Z plane. In FIG. 1, dotted lines 19, 21 and 22 denote the positions of vertical detection planes corresponding to apertures 12, 10 and 11 respectively. It can be seen that this group of detection planes form a triangle with the planes also extending beyond the sides of the triangle. By measuring (as described above) the time of arrival of the centre of a golf ball flying through two or more of the three detection planes 19, 21, 22, and knowing the speed of the ball, the azimuth direction of ball flight can be calculated in a similar manner to the calculation shown above for elevation angle.

It will be appreciated that other arrangements of detection planes can be used to provide the measurement capability for fixing the ball flight direction in azimuth and elevation. Each detection plane is coplanar with a slit aperture and at least one coacting light sensor. Where two or more light sensors are used to form a detection plane, the signals from each sensor are combined to make one composite signal. Two or more detection planes may also be formed using a single slit aperture (as exemplified in FIG. 5).

Referring to FIG. 3, the side of the TX/RX assembly 4 shows a series of vertical slit shaped apertures 23 on the front face 8 of the TX/RX assembly. These apertures allow light reflected off the toe of a clubhead (during a pre-impact phase) to be incident on corresponding light sensors placed at appropriate positions at some distance behind the front face 8. The primary light source that provides the incident light on the clubhead comprises high intensity IR emitters 25 and these may be mounted on the front face 8 so that only back reflected light from the emitters is incident on light sensors behind the front face. The emitted IR light may be continuous or pulsed.

Preferably, two modes of light emission are provided. In a standby mode, very short duration pulses are emitted from at least one emitter and operating in low duty cycle so as to conserve standby power. A wide angle photodiode 26 with appropriate fast response detection circuitry monitors the level of any light reflected back from an object in the field of view. If this level is above a threshold, indicating the presence of reflection from a clubhead or equally reflective object, the system switches into data capture mode with longer pulse duration and/or higher duty cycle. The data capture mode is maintained for a duration greater than the maximum dwell time of a clubhead in the measurement zone, taking account of the slowest expected swing speeds. Alternatively, the data capture mode may be stopped by an interrupt that is generated from an acoustic sensor or other means when the clubhead impacts the ball.

The receiver part of the TX/RX assembly 4 operates in a similar manner to the RX array 15 described above, except that the ball is replaced by a circular reflector zone or highlight 27 attached to the toe 9 of a clubhead 7 and this moves in a direction approximately parallel to the row of apertures 23. The highlight 27 passes through a series of detection planes formed by the apertures 23 and associated light sensors, and this enables the clubhead speed, swingpath angle and off-centeredness (impact point) to be determined. Two additional slit apertures 60, 61 are orientated at an angle to the vertical and, in conjunction with light sensors placed some distance behind, provide two detection planes (denoted by dotted lines 62, 63) that are normal to the Y-Z plane but tilted at a known angle (or angles) to the vertical. The detection planes 62, 63 enable measurements of clubhead elevation path (attack angle) and height at impact.

Figure 2:
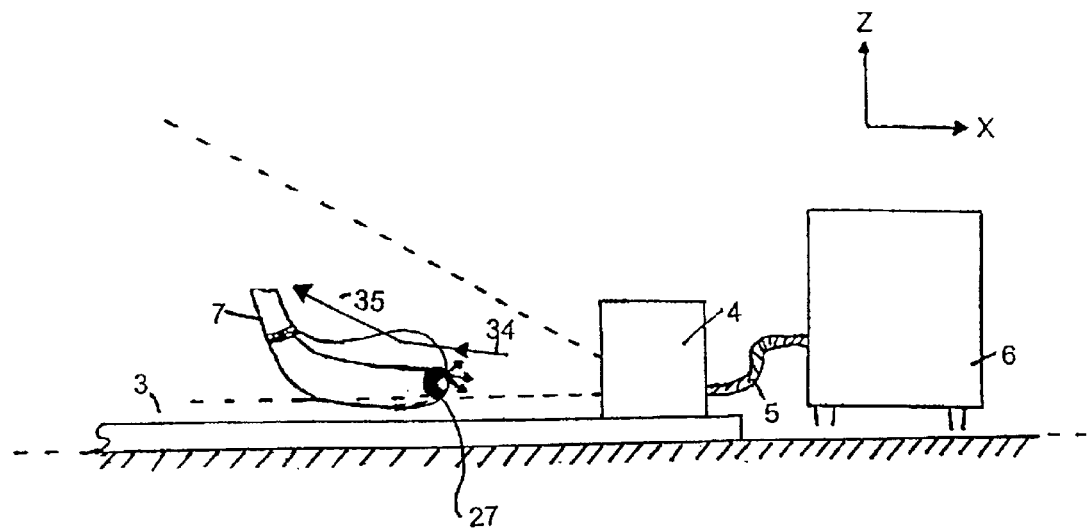
FIG. 2 shows a rear end view of the arrangement in FIG. 1.
Figure 7:
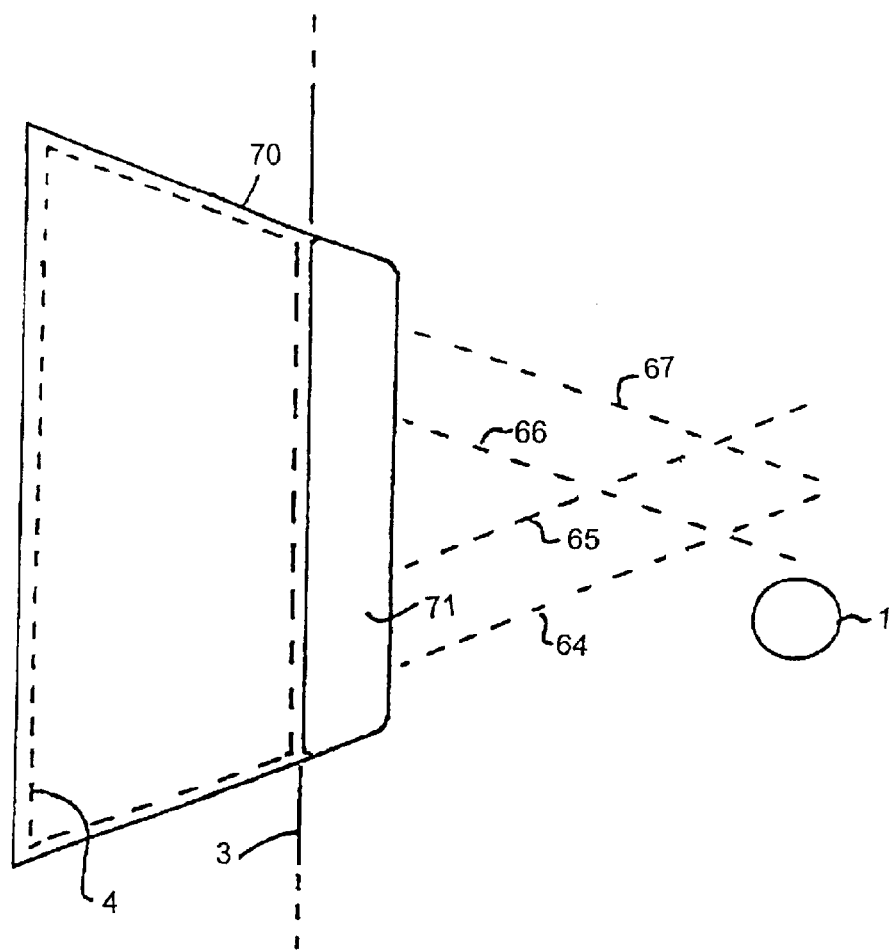
FIG. 7 shows a scale drawing in plan view of preferred additional mechanical details of the arrangement of FIG. 1.
Figure 8:
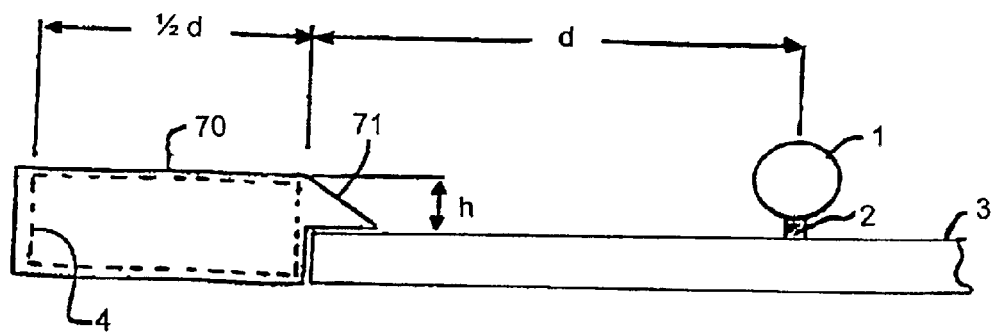
FIG. 8 shows a front view of the arrangement of FIG. 7.

The schematic diagrams of FIGS. 1, 2 and 3 illustrate the essential features of a typical embodiment of the invention and for convenience have not been drawn to scale. Scale drawings illustrating mechanical aspects of a preferred embodiment are shown in FIGS. 7 and 8. This shows the relationship between a golf ball 1 and apparatus comprising a TX/RX assembly 4 and a cover 70. FIG. 7 also shows the nominal positions of four vertical detection planes that are necessary to implement measurements of clubhead speed, swingpath and impact offset. These detection planes are denoted by dotted lines 64, 65, 66, 67.

It is advantageous to design the apparatus to be unobtrusive and also well clear of the ball resting position so that the chance of accidental collision between a clubhead and the apparatus is negligibly small. Thus the overall height 'h' is preferred to be not greater than the height of the centre of the golf ball 1 on its tee 2 (i.e. 30 mm or less). Also the separation 'd' between the tee spot and the top edge of the apparatus is typically 24 cm or greater, giving a generous margin of clearance so that the apparatus is well out of range of wayward clubhead swingpaths. The size of the slit apertures used will depend on the required geometry of the system but they will typically have a length in the range 5–30 mm and a width of 1 mm or less and preferably 0.25 mm or less.

The apertures 23 are preferably formed at or near the same distance d from the tee spot, and the associated light sensors are typically a further 0.5 d beyond the apertures so that the overall distance from tee spot to light sensing devices is typically 36 cm. However other distance ratios can be adopted. In this context, note that for the ball trajectory detection system (TX 14, RX 15) the distance between the sensors and apertures would be typically 25 mm with the distance between the ball and apertures in a range from a few centimeters to 50 cm or more. This greater ratio of distances (compared with the clubhead measuring system TX/RX 4) is allowed because the required accuracy of ball position measurement is proportionally less.

An accidental miss-hit of a golf shot sometimes results in a ball flying very low and at almost 90 to the intended direction. This results in the ball striking the front face 71 of the apparatus. However the imparted ball speed is a small fraction of the clubhead speed, since it is the outcome of a very oblique deflection off the toe of a clubhead. Thus the energy imparted to the ball is very low relative to normal golf shots and it is thus possible to design the cover 70 to withstand this degree of impact. In this respect it is advantageous to provide the cover with a sloping front face 71. This results in an oblique impact from a low trajectory ball and further reduces the impact shock on the cover. The slope angle of the front cover is preferably less than 45 relative to the horizontal, as this ensures that a low trajectory ball does not bounce back towards a player after striking the cover.

The front cover 71 must be sufficiently transparent to IR light to allow proper operation of the TX/RX assembly 4. In one preferred embodiment, the whole cover assembly 70 is fabricated from a high impact and scratch resistant plastic containing a dye that forms an IR transmissive filter while being virtually opaque to visible light. Optionally, the cover can be provided with a cladding that acts both as an impact cushion and a cosmetic covering. In this case the cladding must be selectively removed where necessary to permit correct reception and transmission of IR light to and from the TX/RX assembly 4.

In a similar manner, the TX array 14 and RX array 15 (FIG. 1) are protected from damage by ball impact using a form of impact deflector suitably positioned to cushion and/or deflect low trajectory balls that could result from 'topped' shots. As the height (i.e. the thickness) of the tee-off mat 3 is typically 30 mm or greater, the overall height of the TX array is preferably made equal or less than this height so that a 'topped' golf ball flies clear of the TX array. The arrays 14, 15 are preferably constructed as an integral unit and mechanically linked to the TX/RX assembly 4 so as to maintain correct alignment.

It will be appreciated that TX/RX assemblies 4 and 14, 15 may be positioned at the edges of a tee-off mat and that with the arrangement described, no emitters or sensors are required in the mat.

The four detection planes 64, 65, 66 and 67 in FIG. 7 are formed by four separate sensor/aperture pairs. The preferred means of fabricating the apertures are by any precisely reproducible process such as printing on an IR transparent substrate, by injection mould tooling the apertures on the enclosure wall, or the like. The associated sensors are more difficult to accurately position. It will be appreciated that small relative displacements in the four sensors that form the four detection planes 64, 65, 66 and 67 give rise to magnified displacements of the detection plane intersect points. This magnification is proportional to the ratio of the intersect-to-sensor distance divided by the aperture-to-sensor distance. Errors in the said intersect positions can give rise to errors in the measurement of clubhead parameters.

Small displacements of the intersect points that nevertheless maintain the angular alignment of the overall sensor system are acceptable. However, errors that introduce angular misalignment must be minimised since these critically affect the accuracy of swingpath and clubhead orientation measurement.

Figure 13:
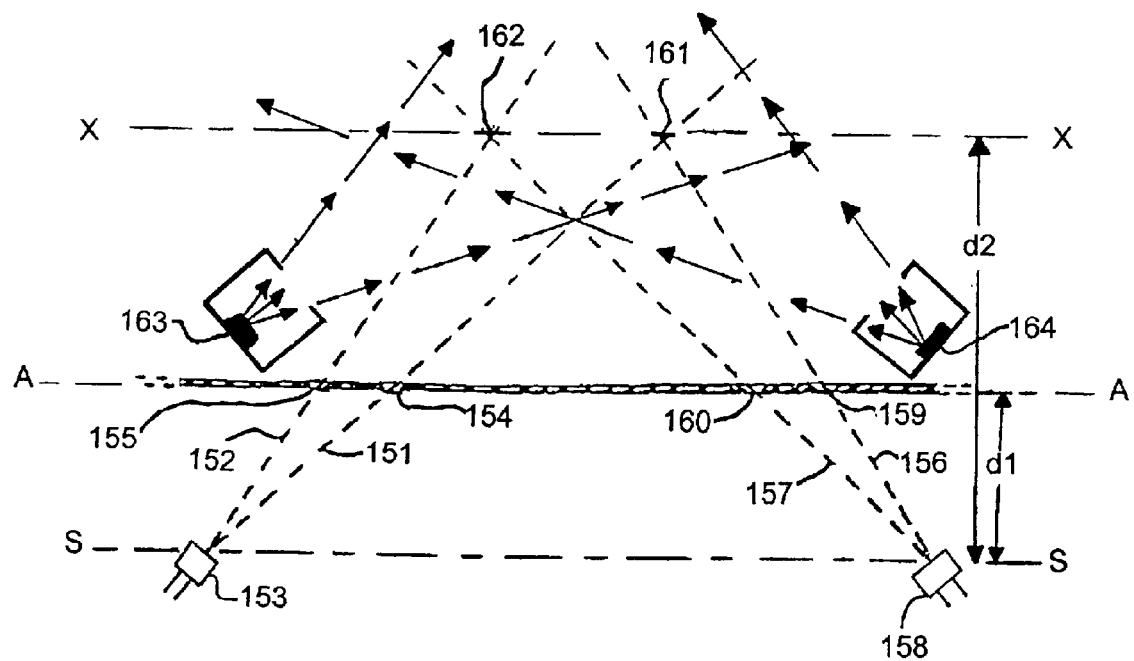
FIG. 13 is a diagrammatic plan view of a preferred arrangement of four vertical detection planes according to the invention.

FIG. 13 shows an arrangement that reduces the dependence of angular alignment to positional errors in the sensors. One pair of vertical detection planes 151, 152 are formed by one sensor 153 coacting with two slit apertures 154, 155. A second pair of vertical detection planes 156, 157 are formed by sensor 158 coacting with slit apertures 159, 160. Intersect 161 is the vertical line of intersection of planes 151 and 156. Intersect 162 is the vertical line of intersection of planes 152 and 157. The plane XX containing intersects 161 and 162 is substantially parallel to the vertical plane AA containing the apertures and to the vertical plane SS containing the sensors. The planes AA and SS are separated by distance d1, and planes XX and SS are separated by distance d2.

For convenience, we assume that the slit apertures 154, 155, 159, 160 are vertical, co-planar and spaced symmetrically. In practice the apertures can be readily formed to comply with such a configuration.

Since there are only two sensors 153, 158, a true vertical plane SS containing these sensors must exist. Also, if plane SS and plane AA are vertical and parallel then plane XX is also vertical and parallel to AA. Furthermore, it is found that small errors in parallelism between vertical planes SS and AA, give rise to nearly equal but opposite errors in parallelism for plane XX. Importantly, small angular alignment errors in the planes are not magnified by the ratio d2/d1.

Figures 4A, 4B:
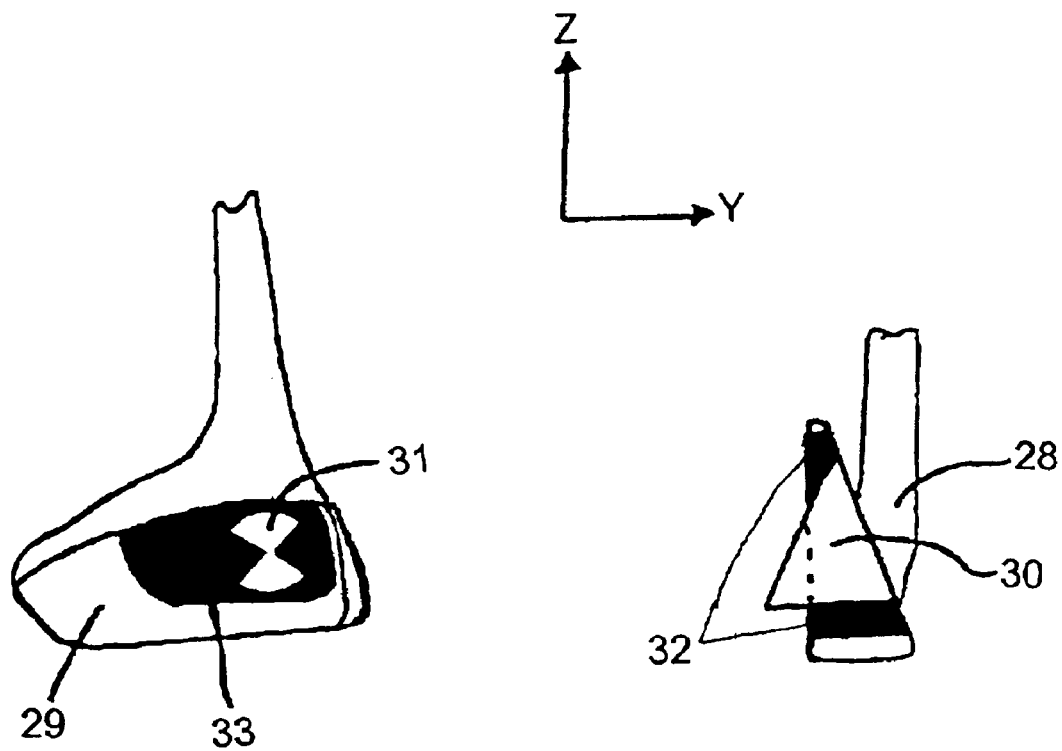
FIGS. 4A and 4B show details and views of two types of clubhead adapted for use with the invention.

FIGS. 4A and 4B show toe-side views of an 'iron' type clubhead 28 and a 'wood' type clubhead 29 modified for use with the invention. Diffusely reflecting highlights 30, 31 are positioned on or near the extreme toe parts of the clubheads. Matt black surface areas 32, 33 cover the parts of the toe regions that could direct strong reflections from the IR emitters 25 back towards the TX/RX assembly 4. The matt black surface areas 32, 33 are designed to have as low a reflectivity to incident IR light as is practical, and any surface form that achieves this aim may be used. The reflecting highlights 30, 31 are typically brilliant white surfaces or they may be highly reflecting polished surfaces with an overlay of translucent light diffusing material. The reflecting highlights should ideally emulate the characteristics of a perfectly diffusing reflector with a lambertian pattern of reflected light intensity.

The clubhead 29 is typical of the clubhead used in FIG. 1. The highlight 31 is in the form of a circular area with two lateral triangular segments removed. It will be appreciated that the quantity of light reflected from this form of highlight increases in approximately a linear manner as the centre of the highlight 31 passes into a detection plane, and then decreases in a similar manner as it passes beyond the plane so as to provide a signal with more clearly defined maxima compared to that shown in FIG. 6. Also, as the clubhead rotates about the X axis (for small angular rotations, typical of clubhead behaviour) the same general shape and peak amplitude of response is maintained. Thus, the purpose of removing the triangular segments from the circle is to shape the obtained signal response and increase the detectability of the centre of the highlight.

A preferred highlight shape is the triangular form shown in FIG. 4*b*. This shape is also preferred in wood clubs. Provided a detection plane is sufficiently narrow to view only part of the triangle between any two corners, then the points in time when each corner passes through the centre of the detection plane can be found accurately by extrapolating the data either side of the said points in time. By this means the rotation of the triangle about three axes can be detected from the response to the triangle highlight in different detection planes. From this, accurate measurements of lie angle, loft angle and clubface angle can be implemented.

Figure 14:
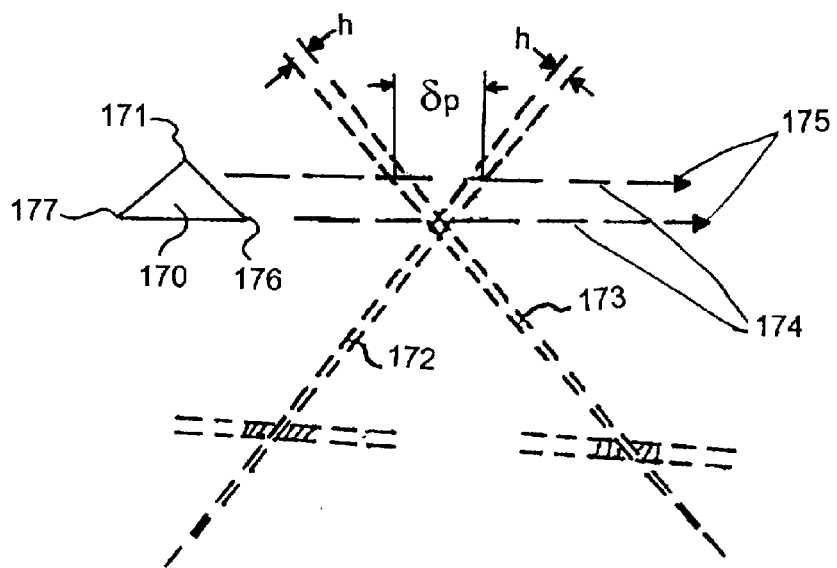
FIG. 14 is a detailed view of a triangular highlight and two intersecting vertical detection planes.

For example, in FIG. 14, a triangular highlight 170 is shown in plan view with the top corner 171 of the highlight tilted back corresponding to a "toe up" lie angle error. Two intersecting vertical planes 172, 173 are disposed at different angles across the path of the highlight 170, where the path and direction of motion are shown by dotted lines 174 and arrows 175. Note that the detection planes have thickness h, which is small compared to the separation (in plan view) between each corner of the highlight 170.

The bottom corners 176, 177 of the highlight both pass through the vertical intersection of the detection planes, whereas the top corner 171 passes first through plane 172 and then through plane 173. Thus, the two detection plane signal responses will show coincident times for corner 176 passing through each plane, and similarly for corner 177. However, for the top corner 171 a time difference corresponding to the path difference δp will occur. Knowing the dimensions of the highlight 170, the speed and lie angle error of the highlight can be computed, where the lie angle is related to δp.

Similarly, a clubface error can be detected if (for example) the leading corner 176 passes through both detection planes simultaneously but the trailing corner 177 passes through the two planes at different times.

In the above description we have chosen simple examples where at least one corner of the highlight passes through the intersection of the detection planes 172, 173. The principle of measurement is also applicable to the general case where the highlight path is offset from the intersection and where any combination of lie, loft, clubface and swingpath occurs.

To correctly implement these measurements, it is important that the plane containing the three corners is in known relationship (preferably normal) to the clubface and sole of the clubhead, and that one side of the triangle is in known relationship to the loft of the clubface.

Note that the triangular highlight can be provided on a curved surface so as to confirm to the normal profile of the toe of a clubhead. This implementation is still valid provided that the three corners of the curvilinear shape are in known relationship to the clubface and sole of the clubhead.

It should be noted that for the greater part of a clubhead surface area, namely those areas that face away from the TX/RX assembly (during a 'normal' or 'acceptable' golf swing), the surface finish is advantageously highly polished or glossy, as is normally the case in traditional golf clubs. On such areas, incident light from the IR emitters 25 is efficiently reflected, but always directed away from the TX/RX assembly. In particular, all the top surface of a clubhead and also the hosel, ferrule and shaft of a club come into this category. This is exemplified in FIGS. 1 and 2 where a light ray 34 is incident on the top surface of the clubhead 7 and a sharply (as distinct from diffusely) reflected light ray 35 is directed away from the TX/RX assembly. It is thus evident that the modification to a standard club comprising a reflecting highlight 30 or 31 and non-reflecting area 32 or 33 can be hidden from the view of a golfer as he or she plays a shot.

To improve highlight contrast it is preferable to provide a light source for each detection plane that is angled across the detection plane. This ensures that distant reflective objects that may lie in the field of view of a detection plane (e.g. a golfer's shoe or the like) are not also illuminated by an associated light source and so generate spurious sensor signals. This arrangement requires multiplexing different light sources and sampling corresponding sensor channels. A typical arrangement is shown in FIG. 13 where two pulsed LED's 163, 164 are driven in alternate cycles. LED 163 illuminates across the part of detection planes 156, 157 that includes the intersects 161, 162 and a requisite space around these intersects. Similarly, LED 164 illuminates across detection planes 151, 152. When LED 163 is ON, LED 163 is OFF and sensor 153 is sampled. This arrangement also rejects unwanted signals arising from reflections off the race and back of a clubhead.

In its simplest form, the modification to a standard clubhead comprising the reflecting and non-reflecting portions can be provided as a self adhesive printed label, but other forms of modification can be provided. For example, lightweight rubber or plastic molded attachments can be provided, and this also allows modification of the surface profile to optimise the light source characteristic. If a second highlight on a clubhead is provided, it is preferable to position this remote from the toe highlight, for example on the back of a clubhead and near the heel or on the hosel. This allows measurement of clubface angle and rotation providing the positions of the highlight centres are accurately known in relation to the clubface.

Figure 9:
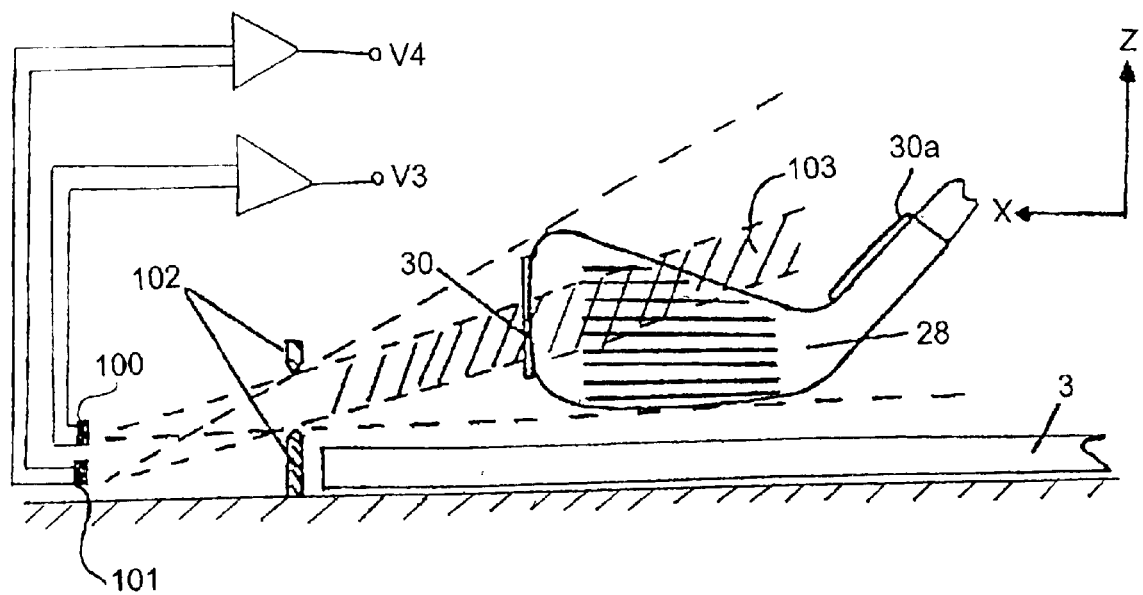
FIG. 9 is a schematic diagram of an arrangement of discrete sensors and slit aperture to provide two coplanar detection planes, according to another embodiment of the invention.
Figure 10:
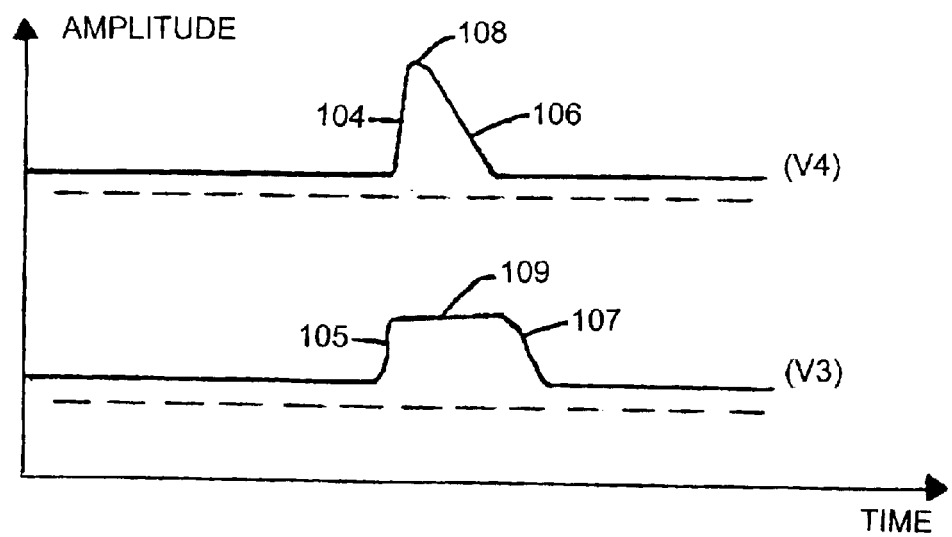
FIG. 10 shows time dependent waveforms typical of signals that are generated in the arrangement of FIG. 9.

Referring now to FIGS. 9 and 10, the outputs from discrete sensors 100, 101 are amplified and give rise to signals V3 and V4 respectively. The two sensors are positioned in vertical relationship and receive light through an aperture stop 102 that provides a vertical slit aperture. The resulting combined angle of view contains two detection planes that are coplanar, vertical and overlap in the region 103 (shown shaded). It will also be noted that the detection plane defined by sensor 100 terminates just above the surface of the tee-off mat 3. A clubhead 28 is provided with a vertical triangular shaped highlight 30 (as illustrated in FIG. 4B). The highlight 30 is symmetric about the vertical when the clubhead 28 is in properly grounded position. As the clubhead passes through the overlapping detection planes, part of the highlight 30 extends beyond at least one of the two planes. Comparison of the signal waveforms (V3, V4) allows an estimate of the height of the clubhead as it passes through the detection planes. Additionally, the relative slope of the leading and trailing edges of the signal waveforms allows an estimate of the clubhead dynamic loft (i.e. rotation about the X axis).

In a preferred arrangement, two sensors 100, 101 are used with a single slit aperture as shown in FIG. 9 and the clubhead is provided with a first highlight 30 on the toe as described above and a second highlight 30A on the hosel. If the spacing between the sensors 100, 101 corresponds to the length of the slit aperture, eg both being around 15 mm, the overlap region 103 will have parallel sides and if the width of this region is less than the vertical dimension of the highlight 30, this ensures that the signals received by the two sensors 100, 101 differ so information on the vertical position of the clubhead can be deduced therefrom. As indicated above, measurement of the waveform produced by the highlight 30 allows the dynamic loft of the clubhead to be estimated. The data received from the two highlights 30, 30A also enables the dynamic lie of the clubhead, ie its rotation about the Y axis, to be estimated.

The arrangement of FIG. 9 allows the overall height of the combined detection plane at the clubhead to be increased by having sensor 101 placed below the level of the tee-off surface. Thus, the vertical range required in the detection plane can be provided using a reduced length aperture and thus a relatively low profile housing.

Referring now to FIG. 10, typical waveforms for V3 and V4 show how height and tilt of the clubhead 28 can be measured. The rate of rise of the leading edges 104, 105 of the waveforms are steeper than the respective trailing edges 106, 107 and this indicates that the clubhead was de-lofted as it passed through the detection planes. Also, the waveform shapes show that only a lower part of the highlight 30 passed through the field of view of sensor 100, and that most of the highlight, including the upper portion, passed through the field of view of sensor 101. Detailed analysis of the waveforms allows precise measurement of the height and dynamic loft of the clubhead through the detection planes.

Figure 11:
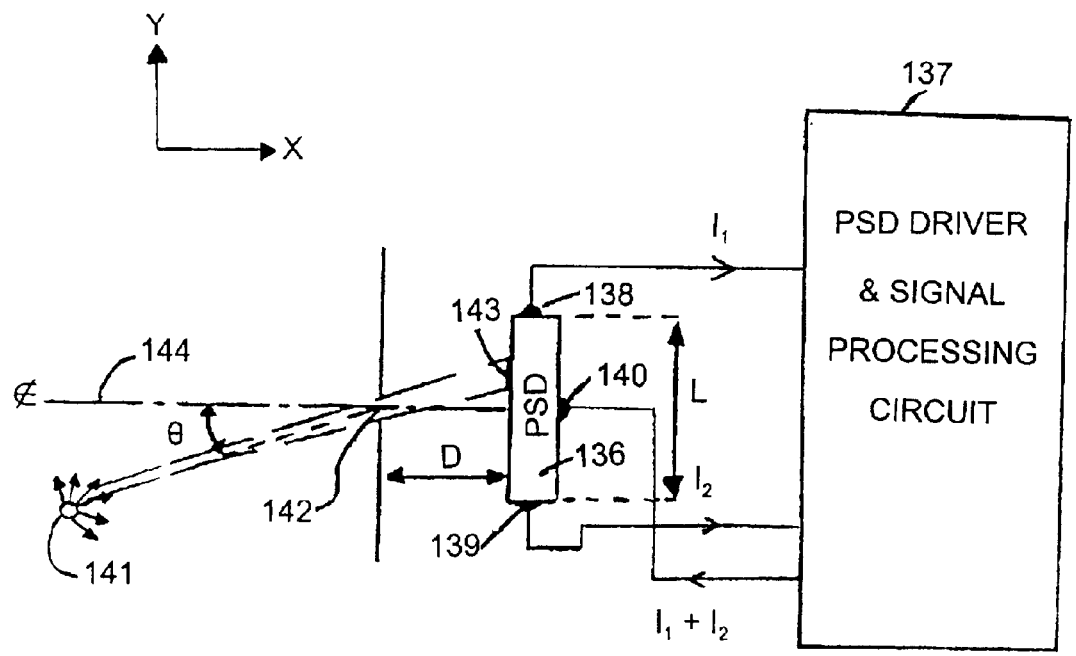
FIG. 11 is a diagrammatic plan view illustrating the combination of a PSD device and a slit aperture used in further embodiment of the invention.
Figure 12:
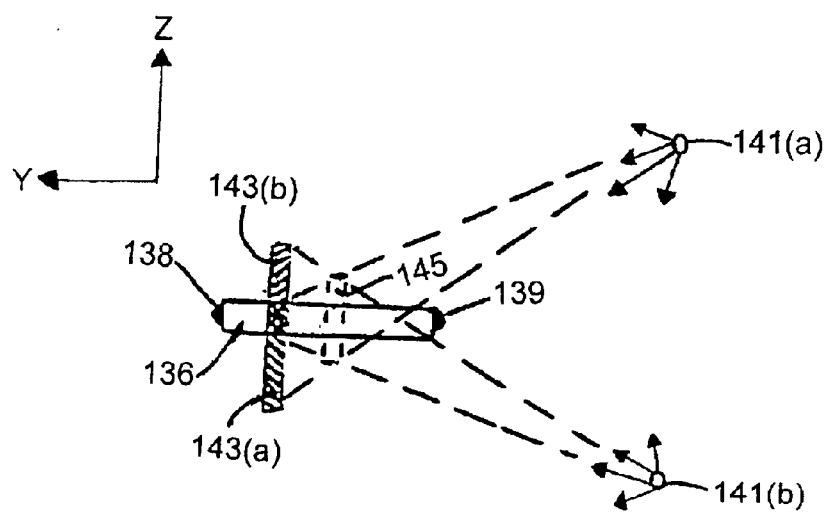
FIG. 12 is a diagrammatic side view of the arrangement shown in FIG. 11.

Referring now to FIGS. 11 and 12, a further embodiment of the invention is shown where a three-terminal position sensitive detector (PSD) device 136 coacting with a pulse modulated LED highlight 141 is used in place of discrete sensors and diffusely reflecting highlights. In this arrangement battery power and control circuitry for the LED 141 must be provided on the clubhead. The PSD is connected to driver and signal processing circuitry 137. A voltage bias is applied to terminal 140 with respect to terminals 138 and 139, and the currents $I_1$ and $I_2$ flowing out of terminals 138 and 139 respectively are measured and recorded. These currents are proportional to the total incident light on the PSD, plus a very small component of 'dark current'. Radiated light from the LED highlight 141 passes through a slit aperture 142 and forms a light spot 143 on the PSD. The position of this light spot along the active length L of the PSD varies as a function of θ, where θ is the angle subtended between a centreline 144 and the line of sight between the highlight 141 and the aperture 142. The relationship between the currents flowing out of terminals 138 and 139 and the angle can be expressed as follows:

$$\tan(\theta) = (L/2.D).((I1-I2)/(I1+I2))$$

where D is the separation between the aperture 142 and the photosensitive surface of the PSD.

The above equation assumes that dark current and photocurrent from other ambient light sources are negligible and that the PSD is ideal and centrally aligned with the aperture.

In FIG. 12, two highlights 141a and 141b represent two possible vertical positions of the single highlight that is shown in plan view in FIG. 11. The position of the vertical slit aperture is shown in dotted outline 145. Light from highlights 141a and 141b passing through this aperture forms two vertical light slits 143a and 143b respectively. These light slits are in-line and partially overlap, and it can be seen that light from both positions 141a and 141b of the highlight form a light spot on the same part of the elongate surface of the PSD 136. Thus, although the magnitudes of the current signals may change, the ratio of their sum and differences as given above does not vary with vertical displacement. Thus, the PSD 136 and slit aperture 145 effectively provide a set of vertical detection planes, each corresponding to a successive pulse emission of the LED highlight 141, and the angular directions of these detection planes about the Z axis can be determined by measurement of the PSD currents.

Furthermore, for each angular direction, the total current ($I_1+I_2$) is proportional to the received light intensity. Thus the radiation pattern of the LED can be traced as it rotates and moves across the PSD sensor. Provided that the LED emission pattern axis is traced and is known in relation to the clubhead, then the orientation and motion of the clubhead can be derived therefrom.

In a further embodiment, rather than using wide angle light emitters as described above and sensors with a field of view defining a detection plane, the emitters may instead be arranged to emit light only in a given plane and wide angle sensors used to detect when light is reflected from this plane. Thus, in this arrangement, the light emitters define the detection plane, e.g. by use of a slit aperture adjacent a light source, rather than the light sensors. If more than one detection plane is used in this arrangement, it may be necessary to time complex the emitters to avoid signals from the different detection planes interfering with each other.

The invention has been described above with particular reference to the motion of a golf clubhead and/or the motion of a golf ball during execution of a golf shot but it will be appreciated that apparatus operating on the principles described above may also be used in measuring parameter relating to the trajectory and/or motion of moving articles in other applications.

What is claimed is:

1. An apparatus for providing an output dependent on an orientation of a moving object relative to its direction of movement, comprising:

(a) light-reflective means carried with the object for movement with the object in the direction of movement, the light-reflective means defining three reference locations on the object, the three reference locations being spaced from one another on the object in the direction of movement, and each of the three reference locations being displaced on the object from alignment with the other two of the three reference locations;

(b) detection means for defining a narrow detection plane transverse to the direction of movement, the detection means being responsive to movement of the light-reflective means through the detection plane, the detection means comprising:

(i) light-emitting means for emitting light transversely of the direction of movement for reflection within the detection plane from each of the three reference locations individually during movement of the object through the detection plane; and (ii) light-responsive means responsive to the light reflected within the detection plane from each of the three reference locations individually to provide an electric signal, the electric signal having a waveform that varies in amplitude with time in accordance with the movement of the object through the detection plane, the light-responsive means comprising means for generating the electric signal to have a waveform that includes amplitude excursions corresponding to the light reflected within the detection plane from the three reference locations respectively, each amplitude excursion being generated progressively in real time as the respective reference location passes progressively through the detection plane, and the amplitude excursions having relative timings within the waveform synchronised to passage of the respective reference locations through the detection plane; and (c) means responsive to the waveform of the electric signal for providing the output, the output being provided in accordance with the amplitude excursions and their relative timings in the waveform.

2. The apparatus according to claim 1, wherein the means responsive to the waveform of the electric signal is means responsive to the relative timings of the amplitude excursions to provide representation of speed of movement and orientation of the object.

3. The apparatus according to claim 1, wherein the light-emitting means emits pulse-modulated light.

4. The apparatus according to claim 1, wherein the light-emitting means emits a light beam crossing the detection plane.

5. The apparatus according to claim 1, wherein the light-reflective means comprises a substantially triangular zone having light reflectivity, the three reference locations being defined respectively by three corners of the triangular zone.

6. The apparatus according to claim 5, wherein the light-responsive means comprises means responsive to relative amplitude of the amplitude excursions.

7. The apparatus according to claim 1, wherein the light-responsive means comprises light-sensing means and means defining a slit aperture for limiting the angular extent to which the reflected light is incident on the sensing means.

8. The apparatus according to claim 7, wherein the angular extent is at least 5 degrees in the plane of the slit-length and 1 degree at most normal to that plane.

9. The apparatus according to claim 1, wherein the detection means defines first and second mutually-inclined detection planes that are both transverse to the direction of movement for responding to movement of the light-reflective means through the first and second detection planes respectively, the detection means comprising light-source means for emitting light for reflection within the first and second detection planes from the reference locations during movement of the object through the respective first and second detection planes, first sensing means responsive to the light reflected within the first detection plane from the reference locations to derive first electric signals in accordance with movement through the first detection plane of the three reference locations respectively, second sensing means responsive to the light reflected within the second detention plane from the reference locations to derive second electric signals in accordance with movement through the second detection plane of the three reference locations respectively, and wherein said apparatus includes means for providing comparison between the first and second signals.

10. The apparatus according to claim 9, wherein the means for providing comparison between the first and second signals derives representations of speed of movement and of orientation of the object from the comparison.

11. The apparatus according to claim 1, wherein the detection means defines first and second coplanar detection planes transverse to said direction for responding to movement of the light-reflective means through the first and second detection planes respectively, the first and second detection planes overlapping one another, and the detection means comprising a light-source means for emitting light for reflection within the first and second detection planes from the reference locations during movement of the object through the respective first and second detection planes, a first sensing means responsive to the light reflected within the first detection plane from the reference locations to derive first electric signals in accordance with movement through the first detection plane of the three reference locations respectively, a second sensing means responsive to the light reflected within the second detection plane from the reference locations to derive second electric signals in accordance with movement through the second detection plane of the three reference locations respectively, and wherein the apparatus includes means for providing comparison between the first and second signals.

12. The apparatus according to claim 11, wherein the comparison is between waveforms of the first and second signals to derive representation of orientation of the object.

13. A golf-swing analyser apparatus for providing an output dependent on the orientation of a golf-club head during swing of the club by a golfer, comprising:
(a) means defining a swing region through which the golfer may swing the golf club in a swing direction;
(b) light-reflective means for attachment to the golf-club head to define three reference locations of the head spaced from one another in the direction of swing, each of the three reference locations being displaced from alignment with the other two reference locations;
(c) detection means for defining within the swing region a narrow detection plane transverse to the swing direction for responding to movement of the light-reflective means through the detection plane, the detection means comprising:
(i) light-emitting means for emitting light transversely of the swing direction for reflection within the detection plane from the three reference locations during swing of the golf-club head through the detection plane, and
(ii) light-responsive means responsive to the light reflected within the detection plane from each of the three reference locations individually to provide an electric signal, the electric signal having a waveform that varies in amplitude with time in accordance with the movement of the golf-club head through the detection plane, the light-responsive means comprising means for generating the electric signal to have a waveform that includes amplitude excursions corresponding to the light reflected within the detection plane from the three reference locations respectively, each amplitude excursion being generated progressively in real time as the respective reference location passes progressively through the detection plane, and the amplitude excursions having relative timings within the waveform synchronised to the passage of the respective reference locations through the detection plane; and
(d) means responsive to the waveform of the electric signal for providing the output, the output being provided in accordance with the amplitude excursions and their relative timings in the waveform.

14. The golf-swing analyzer analyser apparatus according to claim 13, wherein the means responsive to the waveform of the electric signal is means responsive to the timing of the amplitude excursions relative to one another to provide representation of orientation and speed of movement of the golf-club head during the swing.

15. The golf-swing apparatus according to claim 13, wherein the light-emitting means comprises means to emit pulse-modulated light, and the light-responsive means comprises means responsive selectively to pulse-modulated reflected light.

16. The golf-swing analyser apparatus according to claim 13, wherein the light-emitting means emits a light beam crossing the detection plane.

17. The golf-swing analyser apparatus according to claim 13, wherein the light-reflective means comprises a substantially triangular light-reflective area of the club-head, the three reference locations being defined respectively by three corners of the triangular area.

18. The golf-swing apparatus according to claim 17, wherein the means responsive to the waveform of the electric signal comprises means responsive to relative amplitude of the amplitude excursions.

19. The golf-swing analyser apparatus according to claim 13, wherein the light-responsive means comprises light-sensing means and means defining a slit aperture for limiting the angular extent to which the reflected light is incident on the sensing means.

20. The golf-swing apparatus according to claim 19, wherein the angular extent is at least 5 degrees in the plane of the slit-length and 1 degree at most normal to that plane.

21. The golf-swing analyser apparatus according to claim 13, wherein the detection means defines first and second mutually-inclined detection planes that are both transverse to the swing direction for responding to movement of the light-reflective means through the first and second detection planes respectively, the detection means comprising light-source means for emitting light for reflection within the first and second detection planes from the reference locations during movement of the golf-club head through the respective first and second detection planes, first sensing means responsive to the light reflected within the first detection plane from the reference locations to derive first electric signals in accordance with movement through the first detention plane of the three reference locations respectively, second sensing means responsive to the light reflected within the second detection plane from the reference locations to derive second electric signals in accordance with movement through the second detection plane of the three reference locations respectively, and wherein the golf-swing analyzer apparatus includes means for providing comparison between the first and second electric signals.

22. The golf-swing analyser apparatus according to claim 21, wherein the comparison is between waveforms of the first and second signals to derive representation of orientation of the golf-club head.

23. The golf-swing analyser apparatus according to claim 13, wherein the detection means defines first and second coplanar detection planes transverse to the swing direction for responding to movement of the light-reflective means through the first and second detection planes respectively, the first and second detection planes overlapping one another and the detection means comprising light-source means for emitting light for reflection within the first and second detection planes from the reference locations during movement of the golf-club head through the respective first and second planes, first sensing means responsive to the light reflected within the first detection plane from the reference locations to derive first electric signals in accordance with movement through the first detection plane of the three reference locations respectively, second sensing means responsive to the light reflected within the second detection plane from the reference locations to derive second electric signals in accordance with movement through the second detection plane of the three reference locations respectively, and wherein the golf-swing analyser apparatus includes means for providing comparison between the first and second signals.

24. The golf-swing analyser apparatus according to claim 23, wherein the comparison is between waveforms of the first and second signals to derive representation of orientation of golf-club head.

25. A method for providing an output dependent on the orientation of a moving object relative to its direction of movement, comprising:
   (a) a first step of attaching light-reflective means to the object, the light-reflective means being attached to the object to define three reference locations of the object spaced from one another in the direction of movement, and each of the three locations being displaced from alignment with the other two locations;
   (b) a second step of defining a narrow detection plane transverse to the direction of movement for responding to movement of the light-reflective means through the detection plane, the second step comprising:
      (i) emitting light transversely of the direction of movement for reflection within the detection plane from the reference locations during movement of the object through the detection plane, and
      (ii) responding to light reflected within the detection plane from the reference locations to provide an electric signal, the electric signal having a waveform that varies in amplitude with time in accordance with movement through the detection plane to include amplitude excursions corresponding to the light reflected within the detection plane from the three reference locations respectively, each amplitude excursion being generated progressively in real time as the respective reference location passes progressively through the detection plane, and the amplitude excursions having relative timings within the waveform synchronised to passage of the respective reference locations through the detection plane; and
   (c) a third step of analysis of the waveform for providing the output, the output being provided in accordance with the amplitude excursions and their relative timings in the waveform.

26. The method according to claim 25, wherein the analysis of the waveform comprises responding to the timing of the amplitude excursions relative to one another to provide representation of speed of movement and orientation of the object.

27. The method according to claim 25, wherein the light emitted transversely of the direction of movement is pulse-modulated light.

28. The method according to claim 25, wherein the light is emitted to cross the detection plane.

29. The method according to claim 25, wherein the light-reflective means comprises a substantially triangular zone having light reflectivity, the three reference locations being defined respectively by the three coners of the triangular zone.

30. The method according to claim 25, wherein the third step includes comparison of the amplitudes of the amplitude excursions with one another.

31. The method according to claim 25, wherein the detection plane has an angular extent of at least 5 degrees and thickness of 1 degree at most.

32. The method according to claim 25, wherein the second step comprises a definition-step for defining first and second mutually-inclined detection planes that are both transverse to the direction of movement for responding to movement of the light-reflective means through the first and second detection planes respectively, the definition-step comprising emitting light for reflection within the first and second detection planes from the reference locations during movement of the object through the respective first and second detection planes, sensing the light reflected within the first detection plane from the three reference locations to derive first electric signals in accordance with movement through the first detection plane of the three reference locations respectively, and sensing the light reflected within the second detection plane from the three reference locations to derive second electric signals in accordance with movement through the second plane of the three reference locations respectively, and wherein the third step comprises comparison of the first and second electric signals with one another for providing the output of the method.

33. The method according to claim 32, wherein representations of speed of movement and of orientation of the object are derived from the comparison of first and second electric signals with one another.

34. The method according to claim 25, wherein the second step is a definition-step for defining first and second coplanar detection planes transverse to the direction of movement for responding to movement of the light-reflective means through the first and second detection planes respectively, the first and second detection planes overlapping one another, and wherein the definition-step comprises emitting light for reflection within the first and second detection planes from the reference locations during movement of the object through the respective first and second detection planes, sensing the light reflected within the first detection plane from the reference locations to derive first electric signals in accordance with movement through the first plane of the three reference locations respectively, and sensing the light reflected within the second detection plane from the three reference locations to derive second electric signals in accordance with movement through the second detection plane of the three reference locations respectively, and wherein the third step comprises comparison of the first and second electric signals with one another for providing output of the method.

35. The method according to claim 34, wherein the comparison is between waveforms of the first and second electric signals to derive representation of orientation of the object.

36. A method for analysing the orientation of the head of a golf club during swing of the golf-club by a golfer, comprising:
(a) a first step of defining a swing region through which the golfer may swing the golf club in a swing direction;
(b) a second step of providing light-reflective means on the golf-club head to define three reference locations of the head spaced from one another in swing direction, each of the three reference locations being displaced from alignment with the other two locations;
(c) a third step of defining a narrow detection plane transverse to the swing direction within the swing region for responding to movement of the light-reflective means through the detection plane, the third step comprising:
(i) emitting light transversely of the swing direction for reflection within the detection plane from the three reference locations during swing of the golf club through the detection plane, and
(ii) responding to light reflected within the detection plane from the reference locations to provide an electric signal, the electric signal having a waveform that varies in amplitude with time in accordance with movement through the detection plane to include amplitude excursions corresponding to the light reflected within the detection plane from the three reference locations respectively, each amplitude excursion being generated progressively in real time as the respective reference location passes progressively through the detection plane, and the amplitude excursions having relative timings within the waveform synchronised to passage of the respective reference locations through the detection plane; and
(d) a fourth step of analysis of the waveform, the fourth step including determining the relative timing of the the amplitude excursions in the waveform.

37. The method according to claim 36, wherein the analysis of the waveform comprises responding to the timing of the amplitude excursions relative to one another to provide representation of speed of movement and orientation of the golf-club head.

38. The method according to claim 36, wherein the light emitted transversely of the swing direction is pulse-modulated light.

39. The method according to claim 36, wherein the light is emitted to cross the detection plane.

40. The method according to claim 36, wherein the light-reflective means comprises a substantially triangular zone having light reflectivity, the three reference locations being defined respectively by the three corners of the triangular zone.

41. The method according to claim 36, wherein the third step includes comparison of the amplitudes of the electric signals with one another.

42. The method according to claim 36, wherein the detection plane has an angular extent of at least 5 degrees and thickness of 1 degree at most.

43. The method according to claim 36, wherein the third step comprises a definition-step for defining first and second mutually-inclined detection planes that are both transverse to the swing direction for responding to movement of the light-reflective means through the first and second detection planes respectively, the definition-step comprising emitting light for reflection within the first and second detection planes from the reference locations during movement of the golf-club head through the respective first and second detection planes, sensing the light reflected within the first detection plane from the reference locations to derive first electric signals in accordance with movement through the first plane of the three reference locations respectively, and sensing the light reflected within the second detection plane from the reference locations to derive second electric signals in accordance with movement through the second detection plane of the three reference locations respectively, and wherein the fourth step comprises comparison of the first and second signals with one another for providing the output of the method.

44. The method according to claim 43, wherein representations of speed of movement and of orientation of golf-club head are derived from the comparison of the first and second electric signals with one another.

45. The method according to claim 36, wherein the third step is a definition-step for defining first and second coplanar detection planes transverse to the swing direction for responding to movement of the light-reflective means through the first and second detection planes respectively, the first and second detection planes overlapping one another, and wherein the definition-step comprises emitting light for reflection within the first and second detection planes from the reference locations during swing of the golf-club head through the respective first and second detection planes, sensing the light reflected within the first detection plane from the reference locations to derive first electric signals in accordance with movement through the first detection plane of the three reference locations respectively, and sensing the light reflected within the second detection plane from the reference locations to derive second electric signals in accordance with movement through the second detection plane of the three reference locations respectively, and wherein the fourth step comprises comparison of the first and second electric signals with one another for providing the output of the method.

46. The method according to claim 45, wherein the comparison is between waveforms of the first and second signals to derive representation of orientation of the golf-club head.

47. An apparatus for providing an output dependent on motion of a moving object relative to its direction of movement, comprising:
(a) detection means for defining first and second narrow detection planes inclined to the direction of movement, the detection means being responsive to movement of the moving object through the first and second detection planes in turn, the detection means comprising:
(i) light-emitting means for emitting light for reflection within the first and second detection planes from the object during the movement of the object through the first and second detection planes in turn;

(ii) first light-responsive means responsive to the light reflected within the first detection plane from the object during the movement of the object through the first detection plane to generate a first electric signal, the first electric signal having a waveform which varies in amplitude synchronously with the movement of the object through the first detection plane and which includes an amplitude excursion corresponding to the light reflected within the first detection plane from the object as the object moves progressively through the first detection plane; and (iii) second light-responsive means responsive to the light reflected within the second detection plane from the object during the movement of the object through the second detection plane to generate a second electric signal, the second electric signal having a waveform which varies in amplitude synchronously with the movement of the object through the second detection plane and which includes an amplitude excursion corresponding to the light reflected within the second detection plane from the object as the object moves progressively through the second detection plane; and (c) means for comparing the waveform of the first electric signal with the waveform of the second electric signal to provide the output of the apparatus, the output being dependent on the amplitude excursion of each waveform.

48. The apparatus according to claim 47, wherein the first and second detection planes are inclined to one another transversely of the direction of movement.

49. A method for providing an output dependent on motion of a moving object relative to its direction of movement, comprising:

(a) a first step of defining first and second narrow detection planes inclined to the direction of movement for responding to movement of the moving object through the first and second detection planes in turn, the first step comprising:

(i) emitting light transversely of the direction of movement for reflection within the first and second detection planes from the object during the movement of the object through the first and second detection planes in turn;

(ii) responding to the light reflected within the first detection plane from the object during the movement of the object through the first detection plane to generate a first electric signal, the first electric signal having a waveform which varies in amplitude synchronously with the movement of the object through the first detection plane and which includes an amplitude excursion corresponding to the light reflected within the first detection plane from the object as the object moves progressively through the first detection plane; and (iii) responding to the light reflected within the second detection plane from the object during the movement of the object through the second detection plane to generate a second electric signal, the second electric signal having a waveform which varies in amplitude synchronously with the movement of the object through the second detection plane and which includes an amplitude excursion corresponding to the light reflected within the second detection plane from the object as the object moves progressively through the second detection plane; and (b) comparing the waveform of the first electric signal with the waveform of the second electric signal to provide the output of the apparatus, the output being dependent on the amplitude excursion of each waveform.

50. The method according to claim 49, wherein the first and second detection planes are inclined to one another transversely of the direction of movement.

* * * * *